Sept. 22, 1942.   J. D. LOMBARDI   2,296,529
DEMOUNTABLE FLOWER STAND
Filed Feb. 3, 1941   2 Sheets-Sheet 1
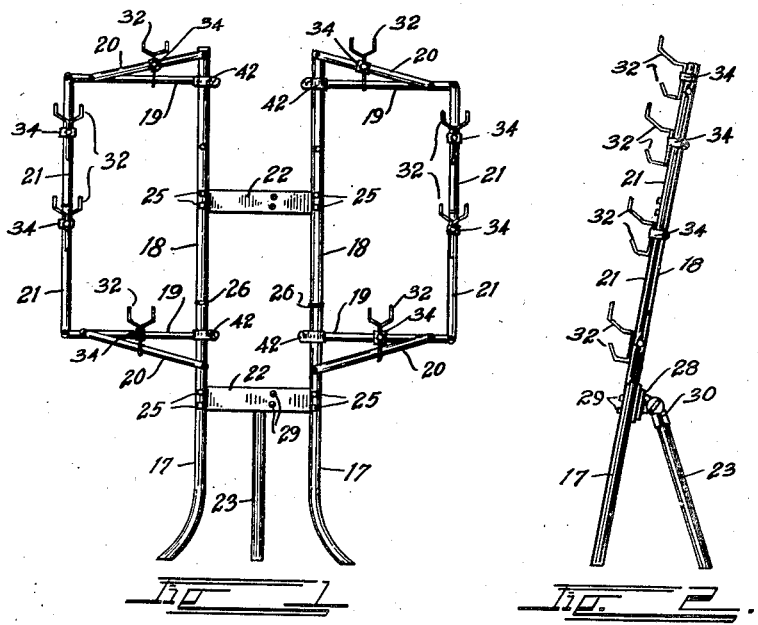
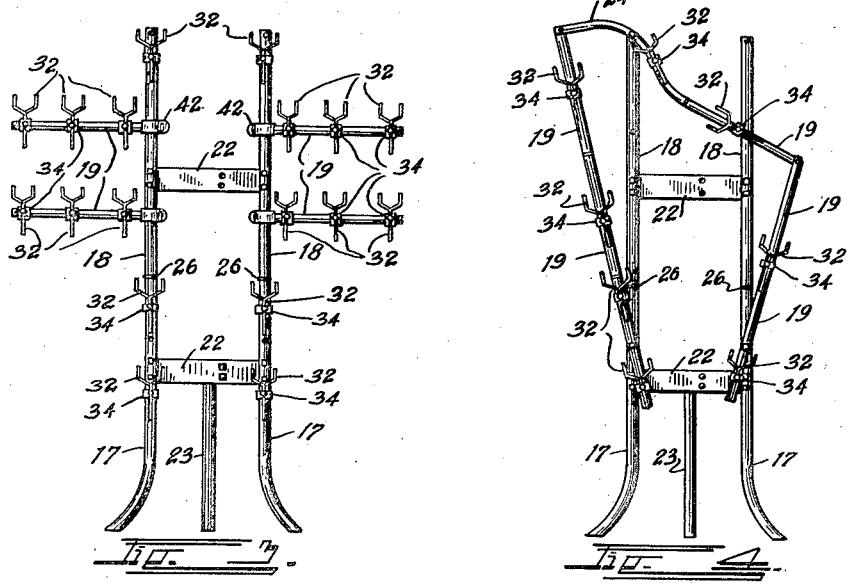
INVENTOR.
JOHN D. LOMBARDI.
BY
ATTORNEY.

Sept. 22, 1942.                J. D. LOMBARDI                2,296,529
                        DEMOUNTABLE FLOWER STAND
                          Filed Feb. 3, 1941            2 Sheets-Sheet 2
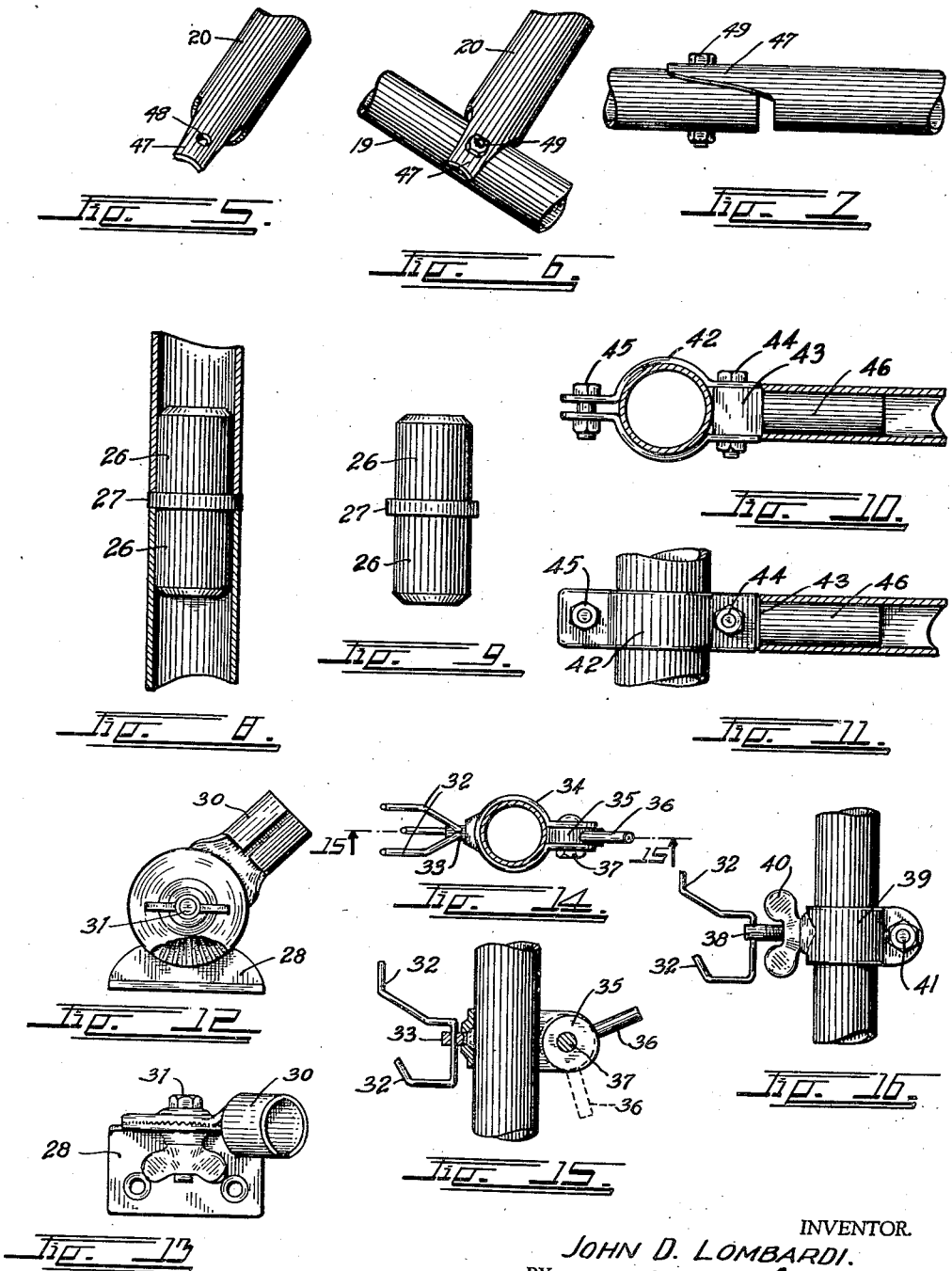
INVENTOR.
JOHN D. LOMBARDI.
BY
                    ATTORNEY.

Patented Sept. 22, 1942

2,296,529

UNITED STATES PATENT OFFICE 2,296,529

DEMOUNTABLE FLOWER STAND

John D. Lombardi, Denver, Colo.

Application February 3, 1941, Serial No. 377,170

5 Claims. (Cl. 248—197)

This invention relates to a cut flower stand and has for its principal object the provision of a sectional device which can be quickly and easily assembled to support cut flowers in any desired design.

It is more particularly designed to be used in mortuaries, churches and the like for arranging and supporting the floral offerings in attractive assembled designs. For instance, it is customary to send bouquets or sprays of flowers to funerals. Ordinarily, these are piled upon or placed about the casket. This invention is designed for quickly combining and supporting these individual donations in complete composed designs of any desired character.

Another object of the invention is to so construct the device that it can be disassembled into a small package for transportation and shipping.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 illustrates the device assembled to form the familiar "gates-a-jar" design;

Fig. 2 is a side view thereof;

Fig. 3 illustrates the invention assembled to form a cross;

Fig. 4 is a similar view illustrating the device assembled to support flowers in the shape of a harp;

Fig. 5 is a detail view illustrating one type of extremity for the standard frame members employed in the invention;

Figs. 6 and 7 are detail views illustrating methods of using the extremity of Fig. 5 in forming joints between the members;

Fig. 8 is a detail sectional view of a second type of joint between two tubular members;

Fig. 9 is a detail view of the joining plug used in the joint of Fig. 8;

Fig. 10 is a detail sectional view of a third type of joint used in assembling the invention;

Fig. 11 is a side view of the joint of Fig. 10;

Figs. 12 and 13 are side and top views, respectively, of the easel leg bracket employed in the invention;

Fig. 14 is a detail top view of a type of flower bracket employed in the invention;

Fig. 15 is a cross section therethrough, taken on the line 15—15, Fig. 14; and

Fig. 16 is a side view of an alternate form of flower bracket.

The invention comprises a plurality of different tubular frame sections provided with means for assembling them into any desired arrangement and for supporting them as a self-supporting unit.

The frame sections are provided with means for supporting flowers, bouquets or floral sprays. The frame sections consist of curved leg sections 17; vertical frame sections 18, tubular bracket members 19; brace members 20; struts 21; separating plates 22; easel legs 23; and harp tubes 24.

The leg members 17 are formed with suitable holes for receiving attachment bolts 25 by means of which one of the separating plates 22 may be secured thereto to hold the two legs in spaced vertical relation. The vertical frame members 18 are also provided with similar holes for receiving similar attachment bolts 25 by means of which the other separating plate 22 may be secured therebetween.

The sections 18 are joined to the sections 17 by means of a joining plug 26, shown in detail in Figs. 8 and 9. The plug is of a diameter to fit snugly into the interior of the tubes and is provided with a medial separating flange 27 to limit the insertion into the tubes.

An easel leg bracket 28 may be secured to one of the separating plates 22 by means of suitable attachment bolts 29. A leg socket member 30 is attached to the bracket 28 by means of a suitable attachment clamp bolt 31 so that its angle of projection can be changed and locked as desired.

The flowers or floral sprays are supported on the device by means of wire brackets or hooks 32. Two alternate methods of supporting the wire hooks are illustrated. In one form, they are passed through a headed stud 33 which projects outwardly from a clamping strap 34. The clamping strap can be secured at any desired point on any of the sections by rotating a cam member 35 through the medium of a handle 36. The cam member is mounted on a pivot bolt 37 extending between the extremities of the strap 34. Whenever the cam is tightened, the head of the stud 33 is clamped between the strap 34 and the section of tubing to prevent rotation of the stud 33. It can be readily seen that with this arrangement, the hooks can be placed on and moved to any desired position along the various sections and can be rotated to project in any desired direction after which they can be instantly clamped into position by simply swinging the handle 36.

An alternate method of supporting the hooks 32 is shown in Fig. 16. In this form, the hooks are also pivoted through and secured in a stud. But, in this case, it is a threaded, headed stud 38 which projects from a clamping strap 39 with its head on the interior of the latter. A thumb lock nut 40 is threaded on the stud by means of which it may be clamped in the strap 39 at any desired angular placement. The strap is clamped to two supporting tubing sections by means of a clamp bolt 41.

Bracket members are also provided for holding certain of the members at right angles to other members. These are illustrated in Figs. 10 and 11 and consist of two clamping plates 42 secured on a bracket block 43 by means of a clamp screw 44. The plates 42 can be clamped to the vertical leg members and the vertical frame members 17 and 18 by means of suitable clamp bolts 45. A cylindrical boss 46 projects from the bracket block 43. This boss is of a size to fit snugly into the extremity of any of the tubular frame members.

It is believed that the formation of the various designs is readily apparent from the above description. In substantially all of the designs, the vertical members 18 are mounted on the leg members 17 by means of the joint plugs 26 and the separating members 22 are secured therebetween. The tubular bracket members 19 are secured thereto by means of the clamp members 42, either to project outwardly to support the members 21, to form the design of Fig. 1, or to support the hooks 32 to form a cross design, as shown in Fig. 3.

The designs illustrated are only a few of the many possibilities of this combination of elements.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A sectional standard for forming floral designs comprising: a plurality of tubing sections; means for joining adjacent sections together; clamp members arranged to be clamped at any desired points along said sections; wire flower supporting hooks rotatably supported by said clamp member; and means for simultaneously locking said hooks in any desired rotative position and closing said clamp members on said sections.

2. A sectional standard for forming floral designs comprising: a plurality of tubing sections; clamping straps surrounding said tubing sections; studs projecting from said straps; flower supporting hooks fixedly carried by said studs; a head on each of said studs positioned between its strap and said tubing section; and means for drawing said strap against said heads to prevent rotation of said studs.

3. A stand for supporting floral designs comprising: two parallel vertical tubular standards; separating plates extending between said standards; an easel leg bracket secured to the middle rear of one of said plates; an easel leg extending rearwardly and downwardly from said bracket; clamping straps surrounding said standards at intervals; means for tightening said straps about said standards at desired positions thereon; tubular bracket members; means extending from certain of said straps entering and supporting said tubular bracket members thereon; flower holding means; and securing means for supporting the flower holding means from the remainder of said straps.

4. A stand for supporting floral designs comprising: two parallel vertical tubular standards; separating plates extending between said standards; an easel leg bracket secured to the middle rear of one of said plates; an easel leg extending rearwardly and downwardly from said bracket; a series of design frame members; means for hingedly connecting said design frame members together to form a given design; and means securing said design frame members to the front of the tubular standards.

5. A means for supporting flowers on a standard comprising: a clamp member arranged to be clamped at any desired point along said standard; a flower supporting hook rotatably supported by said clamp member and means for simultaneously locking said hook in any desired rotative position and closing said clamp member on said standard.

JOHN D. LOMBARDI.